United States Patent
Xu et al.

(10) Patent No.: US 7,914,946 B2
(45) Date of Patent: *Mar. 29, 2011

(54) CATHODE SIDE HARDWARE FOR CARBONATE FUEL CELLS

(75) Inventors: Gengfu Xu, Danbury, CT (US); Chao-Yi Yuh, New Milford, CT (US)

(73) Assignee: FuelCell Energy, Inc., Danbury, CT (US)

( * ) Notice: Subject to any disclaimer, the term of this patent is extended or adjusted under 35 U.S.C. 154(b) by 1264 days.

This patent is subject to a terminal disclaimer.

(21) Appl. No.: 10/867,975

(22) Filed: Jun. 15, 2004

(65) Prior Publication Data

US 2005/0277014 A1 Dec. 15, 2005

(51) Int. Cl.
*H01M 4/64* (2006.01)
*H01M 4/66* (2006.01)
*H01M 8/14* (2006.01)

(52) U.S. Cl. ........ 429/519; 429/478; 429/517; 429/518; 429/522

(58) Field of Classification Search .................... 429/18, 429/26, 30, 34, 38, 40, 45–46, 130, 152, 429/306, 129, 452, 464, 468, 472, 478, 517–520, 429/522, 535; 502/101; 29/623.3–623.5; 427/115; 257/E21.009; 428/701

See application file for complete search history.

(56) References Cited

U.S. PATENT DOCUMENTS

| | | | | |
|---|---|---|---|---|
| 3,522,097 A * | 7/1970 | Tedmon, Jr. et al. | ............ | 429/30 |
| 4,780,437 A * | 10/1988 | Smith | ............ | 502/101 |
| 5,496,655 A * | 3/1996 | Lessing | ............ | 429/34 |
| 5,643,690 A | 7/1997 | Tateishi et al. | | |
| 6,013,386 A * | 1/2000 | Lewin et al. | ............ | 429/30 |
| 6,420,062 B1 * | 7/2002 | Prohaska et al. | ............ | 429/40 |
| 6,645,657 B2 * | 11/2003 | Huang et al. | ............ | 429/34 |
| 6,824,898 B2 * | 11/2004 | Suzuki et al. | ............ | 428/701 |
| 2002/0160257 A1 * | 10/2002 | Lee et al. | ............ | 429/130 |
| 2003/0031910 A1 * | 2/2003 | Satou et al. | ............ | 429/30 |
| 2006/0051661 A1 * | 3/2006 | Meacham | ............ | 429/129 |
| 2007/0231674 A1 * | 10/2007 | Shelnutt et al. | ............ | 429/44 |

FOREIGN PATENT DOCUMENTS

JP 07-183038 7/1995
WO WO0217420 A2 * 2/2002

OTHER PUBLICATIONS

Tao et al. ("Preparation of LiMO2 (M=Co, Ni) cathode materials for intermediate temperature fuel cells by sol-gel processes," Solid State Ionics, 1999, 124, 53-59.).*
Giorgi et al. ("Development and Characterization of Novel Cathode Materials for Carbonate Fuel Cell," J. of Power Sources, 1994, 49, 227-243.).*

* cited by examiner

*Primary Examiner* — Dah-Wei D Yuan
*Assistant Examiner* — Claire L (Rademaker) Roe
(74) *Attorney, Agent, or Firm* — Cowan, Liebowitz & Latman, PC

(57) ABSTRACT

Carbonate fuel cathode side hardware having a thin coating of a conductive ceramic formed from one of LSC ($La_{0.8}Sr_{0.2}CoO_3$) and lithiated NiO ($Li_xNiO$, where x is 0.1 to 1).

6 Claims, 7 Drawing Sheets

CATHODE SIDE HARDWARE FOR CARBONATE FUEL CELLS

STATEMENT AS TO RIGHTS TO INVENTIONS MADE UNDER FEDERALLY SPONSORED RESEARCH AND DEVELOPMENT

This invention was made with Government support under contract DE-FC21-95MC31184 awarded by the Department of Energy. The Government has certain rights in the invention.

BACKGROUND OF THE INVENTION

This invention relates to molten carbonate fuel cells and, in particular, to cathode side hardware employed in such cells.

As used herein the term "cathode side hardware" is defined as the current collector and/or the bipolar plate on the cathode side of a fuel cell and, in particular, a molten carbonate fuel cell. Corrosion is a life-limiting factor for a molten carbonate fuel cells. The prevailing corrosion is at the oxide-gas (or liquid) interface, i.e., at the cathode side hardware. This hardware is typically formed from chromium containing stainless steel and corrosion of the hardware is governed by the outward cation diffusion via metal vacancies. It is estimated that twenty five percent (25%) of the internal resistance of a molten carbonate fuel cell could be attributed to the oxide corrosion layer that forms on the cathode side hardware.

More particularly, the cathode current collector, generally made of 316L stainless steel, becomes corroded during fuel cell operation and multi-corrosion oxide layers having a relatively high electrical resistance are formed on the surface of the collector. Moreover, the formed corrosion layers usually thicken with time.

Additionally, the corrosion layers on the cathode side hardware cause electrolyte loss through surface and corrosion creepage. Electrolyte surface creepage is controlled by capillary forces dominated by the surface roughness, porosity and pore size in corrosion layers. Electrolyte corrosion creepage is controlled by scale thickness and phase composition of the formed scale. In cathode side hardware formed with stainless steel, a high roughness of the scale surface and the porous structure of the scale cause high electrolyte surface creepage.

It has been estimated that electrolyte loss in a molten carbonate fuel cell is a significant life-limiting factor for achieving a lifetime of 40,000 hours. Analysis of cathode side hardware has indicated that sixty five percent (65%) of electrolyte loss is attributed to this hardware. It is estimated that a forty five percent (45%) reduction in electrolyte loss could result in ~1.7 yr life extension of the molten carbonate fuel cell.

In order to counter the corrosion of the cathode side hardware, it has been proposed to provide a protective oxide coating on the cathode side hardware to realize a low contact resistance and low electrolyte loss. These coatings, however, must satisfy stringent requirements in that they must, on the one hand, have a high corrosion resistance, and, on the other hand, a high electrical conductivity. The coatings must also be able to provide a stable surface oxide capable of providing a barrier between the coating alloys and the environment of the molten carbonate fuel cell.

U.S. Pat. No. 5,643,690 discloses a coating of this type in the form of a non-stoichiometric composite oxide layer (Ni ferrite based oxide) formed by in cell oxidation of a layer of Fe, Ni and Cr clad on cathode current collector. Similarly Japanese patent 5-324460 discloses a stainless steel collector plate covered with a NiO layer (formed by oxidation of a Ni layer plated or clad on a cathode current collector). The coatings formed in these cases are porous and consume a significant amount of electrolyte. Also, the electrical conductivity of the layers may not be as high as desired.

U.S. patent application Ser. No. 10/016,552, assigned to the same assignee hereof, discloses another coating layer which is formed as a conductive layer of ceramic material using a sol-gel process. The materials used for the conductive layer in this case are, preferably, $LiCoO_2$ or Co doped $LiFeO_2$, and the thickness of the layer is between 1 to 5 µm.

The aforesaid conductive ceramic layers of the '552 application have proven satisfactory in providing corrosion resistance of the cathode side hardware. However, the materials are costly and add to the overall expense of the fuel cell. Moreover, higher conductivities are still desired. Fuel cell designers have thus continued to search for other coating materials which offer the desired corrosion resistance, but are more cost effective and are higher in conductivity.

It is therefore an object of the present invention to provide cathode side hardware which does not suffer from the above disadvantages; and It is a further object of the present invention to provide cathode side hardware having a high corrosion resistance and electrical conductivity and a lower cost.

SUMMARY OF THE INVENTION

The above and other objects are realized in cathode side hardware by forming the hardware to have a thin film of a dense conductive ceramic coating comprised of LSC ($La_{0.8}Sr_{0.2}CoO_3$) or lithiated NiO ($Li_xNiO$, where x is 0.1 to 1). Preferably, the coating is realized using a sol-gel process.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
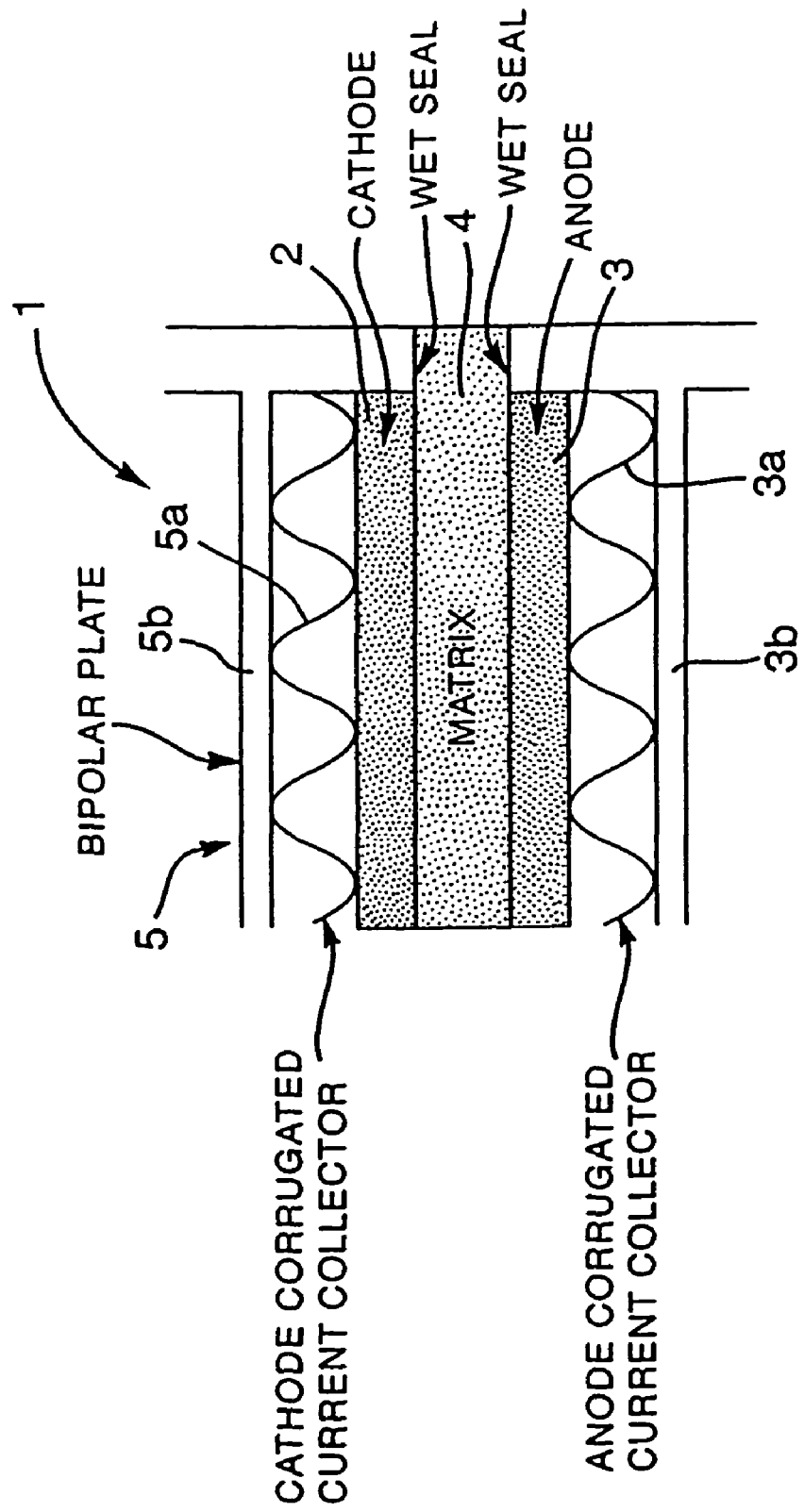
FIG. 1 schematically illustrates a fuel cell including cathode side hardware in accordance with the principles of the present invention.

FIG. 1 schematically shows a fuel having a cathode 2 and an anode 3. Between the cathode 2 and the anode 3 is a matrix 4 containing an alkali carbonate electrolyte. Adjacent the anode 3 is a corrugated current collector 3a and a bipolar plate 3b. Adjacent the cathode 2 is the cathode side hardware 5 comprising a corrugated current collector 5a and a bipolar plate 5b. As shown, the bipolar plates 3b and 5b are the same.

In accordance with the principles of the present, cathode side hardware 5 of the fuel cell 1 of FIG. 1 is coated with a conductive ceramic to obtain lower electrical resistivity for lower contact voltage loss. In further accord with the invention, LSC ($La_{0.8}Sr_{0.2}CoO_3$) and lithiated NiO ($Li_xNiO$, where x is 0.1 to 1), which have previously been proposed for use as cathode materials, are now utilized as coating materials for the cathode side hardware. These materials have a low solubility in alkali molten carbonate (e.g., 2 $\mu g/cm^2/h$ for lithiated NiO) and very high electrical conductivity (600 S/m at 600° C. for LSC, 33 S/cm at 650° for lithiated NiO).

These materials can be coated on the cathode side hardware using a variety of coating techniques. In the present illustrative case, a thin film sol-gel coating process has been employed. This process involves the dissolution of precursors containing the required metal ions in a suitable solvent to form the sol. The sol is then coated on the hardware surface by a spray or dipping process, subsequently gelled, and dried, followed by densification and crystallization.

Drying is generally performed between room temperature and 200° C. The densification and recrystallization processes are usually carried out at temperatures above 350° C. The surface of the metal substrate may require degreasing and pickling to remove surface debris and oxide for better coating adhesion. Although 100% of coating coverage is not necessary for carbonate fuel cell application in terms of ohmic contact resistance, it is desirable to have >95% coverage of the surface by the ceramic coating to achieve the desired benefits of increased corrosion protection and reduced electrolyte loss. The resultant cathode side hardware can thus be provided with the required structure and phase assemblage to provide the desired properties.

The precursors for LSC ($La_{0.8}Sr_{0.2}CoO_3$) and lithiated NiO ($Li_xNiO$, where x is 0.1 to 1) can be acetates or inorganic salts like nitrate or hydroxide. The solutions can be aqueous based or solvent based. The body or substrate member of the cathode side hardware can be stainless steel.

By properly controlling processing parameters, the coating technique and heat treatment (sol-gel in this case), a dense, uniform and smooth thin coating can be obtained. The major corrosion resistance of the dense oxide coated cathode side hardware of the invention is governed by transport through the purposefully coated dense oxide layer. The dense oxide coating significantly delays mobile carbonate ion attack of the underlying body (e.g., stainless steel body) of the hardware.

In particular, the main effect of the formed oxide layer is to barrier gas, vapor and liquid contact with the hardware body. On the other hand, due to the corrosion resistant oxide layer being highly conductive, the contact resistance between the hardware body and the cathode electrode is also reduced as compared with corrosion scale formed on hardware which is uncoated. In comparison to an uncoated hardware body formed of chromium steel, the electrical resistance is lowered 50% as exhibited in out of cell testing.

Moreover, due to the dense and smooth surface of the LSC and lithiated NiO coatings of the cathode side hardware of the invention, surface roughness and corrosion are both minimized. Accordingly, electrolyte surface and corrosion creepage are also minimized.

The coatings of the cathode side hardware have also been found to exhibit favorable adhesion, well matched thermal expansion coefficients, effective electronic conductivity, and protection against hot oxidation/corrosion. Accelerated thermal cyclic testing of the coatings have indicated that the coatings are thin and are very adhesive. Good adhesion is attributed to reaction-bonded structure between the coating and the body of the hardware and also its thin film character (tensile stress is proportional to coating thickness). Matching of bulk properties over the harsh temperature and chemical potential ranges of the fuel cell have also been achieved.

As above-noted, the coatings of the invention ($Li_{0.1}NiO$ and $La_{0.8}Sr_{0.2}CoO_3$) also exhibit a much higher conductivity (33 S/cm of $Li_{0.1}NiO$ and 650 S/cm of LSC) and more importantly, are dense and smooth with a controlled coating thickness, as compared with the $LiCoO2$ coating (conductivity of 1 S/cm) of the '522 application.

The following are two examples of the invention.

EXAMPLE I - Lithiated NiO Cathode Side Hardware (1) Preparation of Lithiated NiO Sol-Gel A starting solution with a nominal Li:Ni composition of 0.1:1 (molar ratio) was prepared using reagent grade Li acetate and Ni acetate as cation source compounds. Appropriate quantities of these materials to be included in the starting solution were then calculated on the basis of obtaining 1 M NiO sol-gel. Measured amounts of the cation source compounds were then mixed with 200 ml distilled water, 300 ml ethylene glycol and 1.5 mol citric acid in a 600 ml beaker to form a precipitate-free starting solution. The starting solution was heated on a hot plate at about 80° C. to concentrate until it turned to a viscous liquid. A green, transparent solution resulted. The solution was allowed to stand at 25° C. in a sealed glass beaker for at least half a year without precipitation. The change in the viscosity of the solution due to polymerization was measured at room temperature by means of a Brookfield viscometer. The viscosity of the precursor increases significantly with increased heating time due to the increase in average molecular weight as a result of polymerization.

(2) Deposition and Formation of Cathode Side Hardware with the Dense, Smooth Lithiated NiO Films A dip-coating technique was used to form wet films of the precursor on corrugated stainless steel (316L) sheets or substrates used as the cathode side bodies. The film thickness was established by controlling withdrawal speed and the viscosity of the precursor. In general, precursors with viscosity below 125 cp at room temperature could not homogeneously wet a smooth substrate, such as stainless steel. On the other hand, highly viscous precursors having a viscosity above about 1000 cP at room temperature resulted in inhomogeneous films and crack formation unless the substrate was heated at higher temperatures. Therefore, it is important to control the viscosity of the solution to obtain high quality films. The viscosity of the precursor solutions used in this Example ranged between 200 and 275 cP at room temperature. With a withdrawal speed of 1 inch/min, dense lithiated NiO oxide films were obtained having a thickness in the range of about 0.5 to about 1 micron for each coating after firing at about 600° C.

To increase sol wetting and increase bond strength between the lithiated nickel oxide film and stainless steel sheets, the sheets were acid treated first, followed by acetone washed ultrasonically to remove any possible dusts and carbon film formed during heat treatment in graphite furnace. Gel film were deposited in a either 1.5 inch by 1.5 inch or 7 inch by 7 inch of a cathode corrugation by dip coating at a substrate withdrawal rate of 1 inch/min. Substrates with gel films were transferred to a furnace preheated to 70° C. just after gel film deposition, held for 3 hours and heated up to a temperature no more than 600° C. for another 3 hours for complete crystallization and sintering.

Figure 2A:
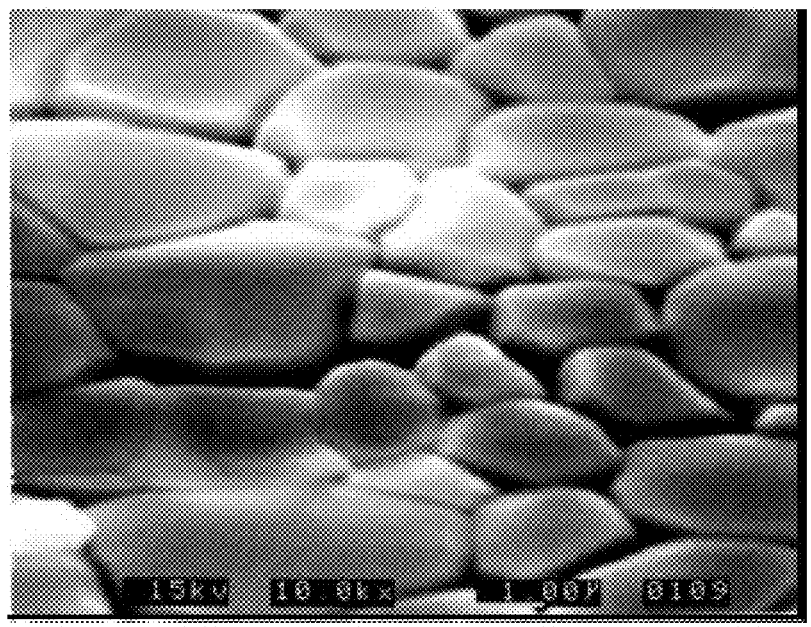
FIGS. 2A and 2B show SEM micrographs of different magnifications of a conductive lithiated NiO coating of cathode side hardware in accordance with the principles of the present invention.
Figure 2B:
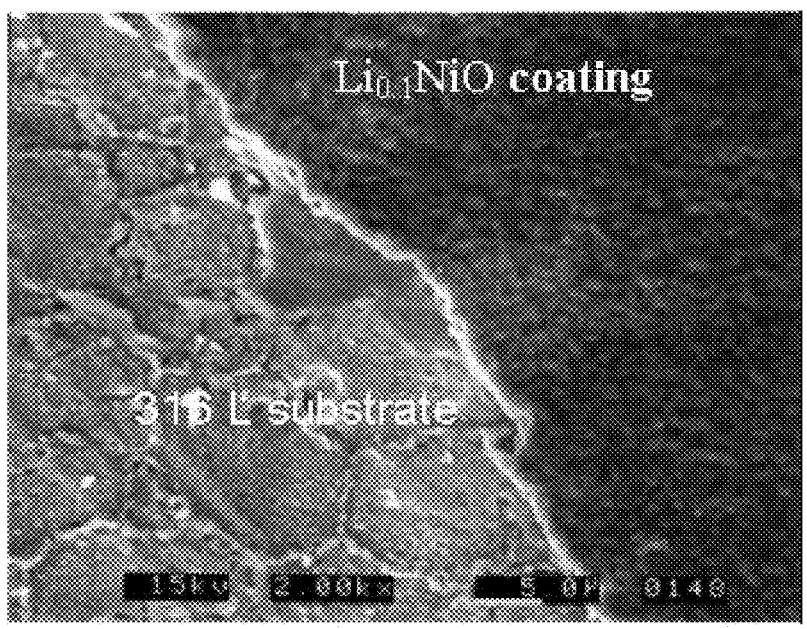

After heating to 600° C., the film remained continuous, smooth and dense on the cathode side hardware body. FIGS. 2A and 2B show SEM photographs of a fractured cross section of the film coated hardware at different magnifications. From these figures, it can be seen that a thin lithiated Ni oxide film of substantially uniform thickness ~1 micron, was realized.

(3) Characterization of the Lithiated NiO Films

Figure 4:
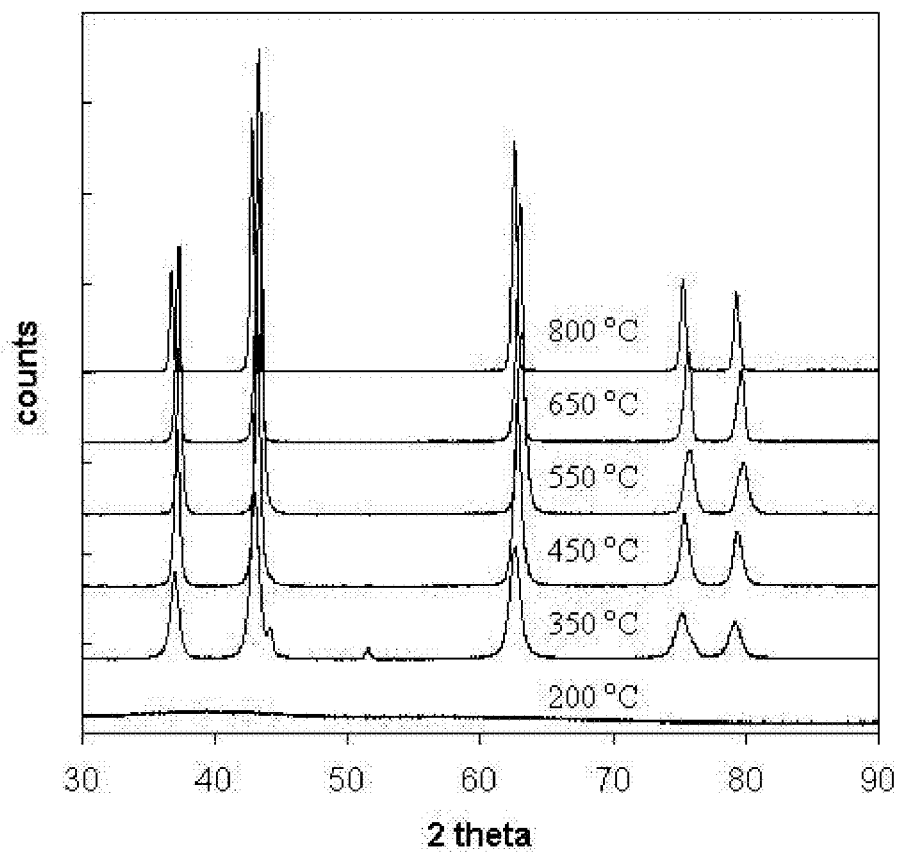
FIG. 4 shows the phase evolution with heat treatment temperature of a lithiated NiO coating of the type shown in FIGS. 2A and 2B synthesized by a sol-gel process.

The phase evolution of the $Li_{0.1}NiO$ oxide films deposited on the stainless steel (316L) substrates were studied by x-ray diffraction analysis performed on a Philips diffractometer, using Cu Ka radiation. The result is shown in FIG. 4. The substrate heat treated at 200° C. shows no peaks, indicating amorphous structure. The formation of the rock salt NiO structure is observed at temperatures as low as 350° C. However, there is a secondary phase formed at 350° C. and is indexed as NiC. At higher temperature, NiC oxidizes to form NiO. At 450° C., crystallization is complete, there is no broadened peaks and the intensities of peaks did not change above 450° C. Except for 200° C. and 350° C., all the coatings are single phase, neither other secondary product nor reactant was detected.

As we can see, lithiated NiO adopt a NiO (rock salt structure) structure and the patterns can be indexed in the Braggs peaks of NiO. There is no preferential position for lithium and nickel ions; thus, there is only one cation crystallographic site. The partial substitution of Nickel (II) (r=0.83 Å) by lithium (I) (r=0.90 Å) implies the creation of nickel (III) (r=0.70 Å) whose ionic radius r is smaller, which shrink the lattice. With higher heat treatment temperature, phases shift to larger angles implying more Li dissolving in the NiO structure (more Ni (III) is created). Also peaks become narrower with increasing temperature indicating crystallite size growth.

EXAMPLE II - $La_{0.8}Sr_{0.2}CoO_3$ Cathode Side Hardware (1) Preparation of $La_{0.8}Sr_{0.2}CoO_3$ Sol-Gel A starting solution with a nominal La:Sr: Co composition of 0.8:0.2:1 (molar ratio) was prepared using reagent grade La nitrate hydrate and Sr nitrate hydrate and Co nitrate hydrate. Appropriate quantities of these materials to be included in the starting solution were then calculated on the basis of obtaining 1 M LSC sol-gel. Measured quantities of the cation source compounds were then mixed with distilled water (150 ml), ethylene glycol (350 ml) in a 600 ml beaker to form a precipitate-free starting solution. The starting solution was then heated on a hot plate at about 80° C. to expel the water and other volatile matter and form a viscous polymer precursor comprising a polymer containing the metal cations. It is important that the cations remain in solution throughout the polymerization process. The change in the viscosity of the solution as it was converted into the polymeric precursor was measured at room temperature by means of a Brookfield viscometer.

(2) Deposition and Formation of Cathode Side Hardware With Smooth, Dense LSC Films To increase sol wetting and increase bond strength between the LSC film and the stainless steel (316L) cathode side hardware, the stainless steel was acid treated first, followed by acetone washed ultrasonically to remove any possible dust and carbon film formed during heat treatment in graphite furnace. Gel film were deposited in a either 1.5 inch by 1.5 inch or 7 inch by 7 inch of a cathode corrugation by dip coating at a substrate withdrawal rate of 1 inch/min. Gel film were transferred to a furnace preheated to 70° C. just after gel film deposition, held for 3 hours and heated up to a temperature no more than 600° C. for another 3 hours for complete crystallization and sintering.

Figure 3:
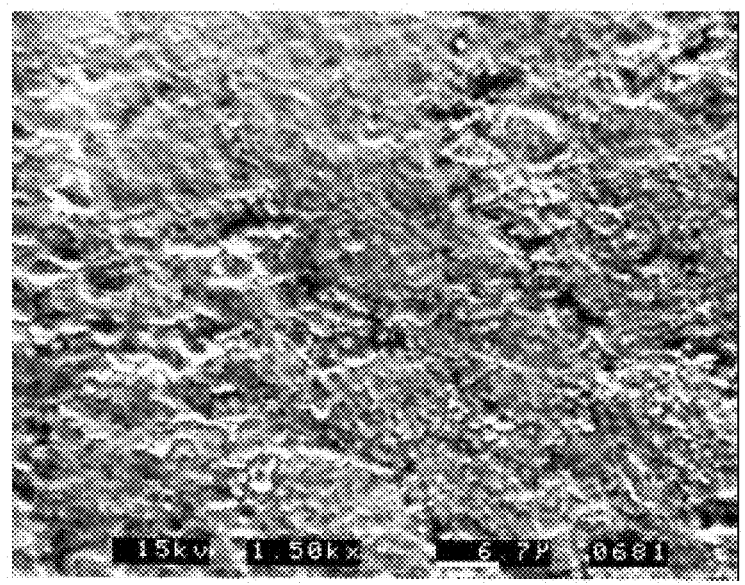
FIG. 3 shows an SEM micrograph of a conductive LSC coating of cathode side hardware in accordance with the principles of the present invention.

After heating to 600° C., the film remained continuous, smooth and dense on the cathode side hardware body. FIG. 3 shows a SEM photograph of the surface morphology of the LSC coated cathode side hardware.

The effect of thermal cycling on the integrity of the litiated NiO and LSC coated cathode side hardware sheets was also evaluated. Examination of the post cycling specimens by optical microscopy and SEM revealed that the coatings were thermally compatible with the hardware body or substrate, without detectable thermal stress induced cracks or microcracks.

Figure 5A:
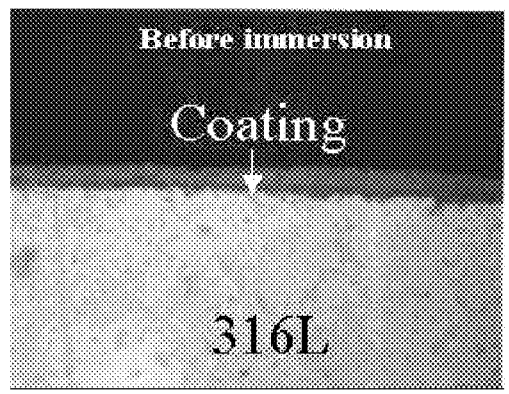
FIGS. 5A-5D illustrate the effect of immersion corrosion testing both on cathode side hardware coated with a lithiated NiO conductive coating in accordance with the invention and on uncoated cathode side hardware.
Figure 5B:
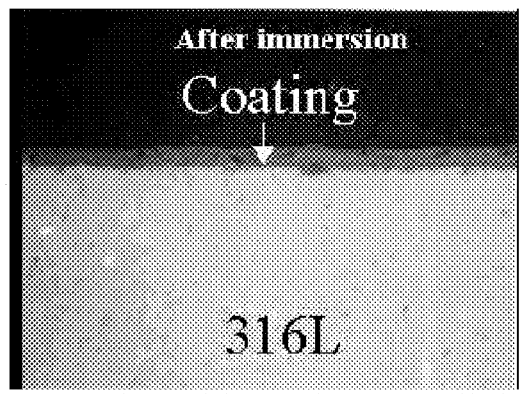
Figure 5C:
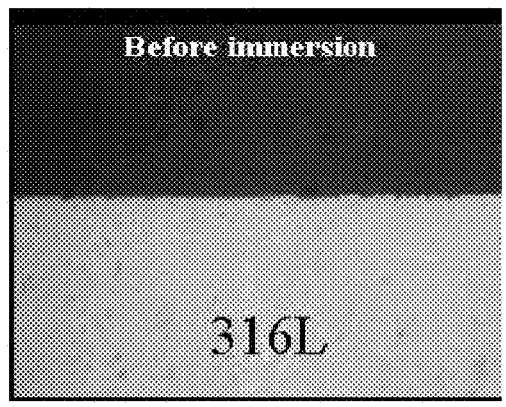
Figure 5D:
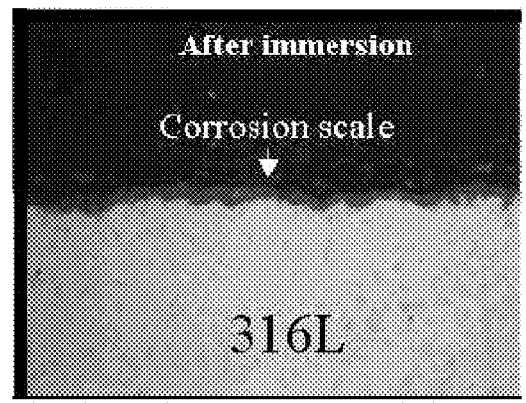

The cross sectional SEM observations for a representative example of cathode side hardware coated with lithiated NiO in accord with the invention as compared with uncoated cathode side hardware is shown in FIGS. 5A-5D. As can be seen, the lithiated NiO coating of the invention (FIGS. 5A and 5B), had significantly reduced the thickness of the corrosion scale, as compared to the uncoated hardware (FIGS. 5C and 5D). More particularly, the corrosion scales show a similar dual-layered structure whether or not sol-gel coated. However, for the coated hardware, the outer oxide scale may have been denser to better protect the inner Cr-rich scale. Consequently, the Cr-rich inner scale of the coated sheets was denser and more protective to reduce the overall corrosion rate.

Figure 6A:
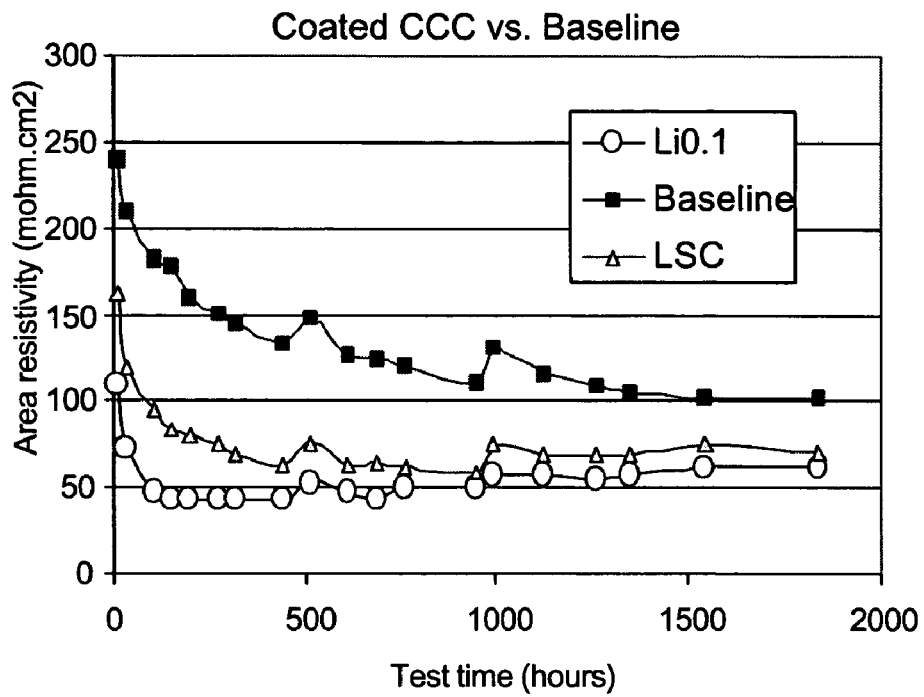
FIGS. 6A and 6B show the out-of-cell electrical resistivity and the out-of-cell metal-to-metal electrical resistivity, respectively, of uncoated cathode side hardware and cathode side hardware coated with a lithiated NiO coating and an LSC coating in accordance with the invention.
Figure 6B:
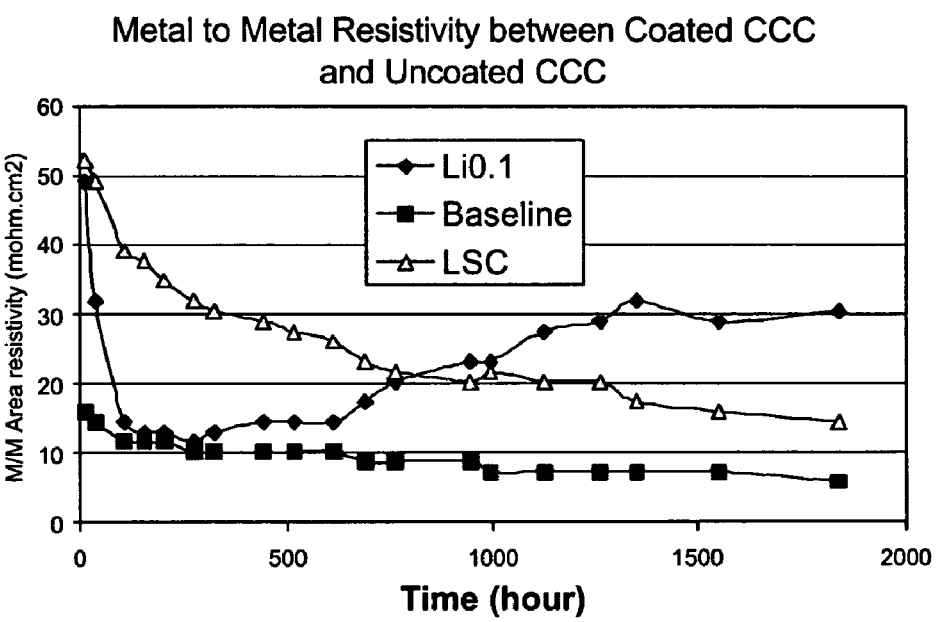

FIG. 6A shows the out-of-cell electrical resistivity of cathode side hardware in the form of a cathode current collector ("CCC") having the lithiated NiO and LSC coatings of the invention. It also shows the out-of-cell electrical resistivity of a non-coated stainless steel current collector. As can be seen, the coated CCCs of the invention have comparable resistivities to the non-coated CCC. Additionally, as can be seen from FIG. 6B, the out-of-cell current collector-to-electrode resistivities (metal-to-metal) of the CCCs of the invention are also comparable to the current collector-to electrode resistivity of the non-coated stainless steel CCC.

Figure 7:
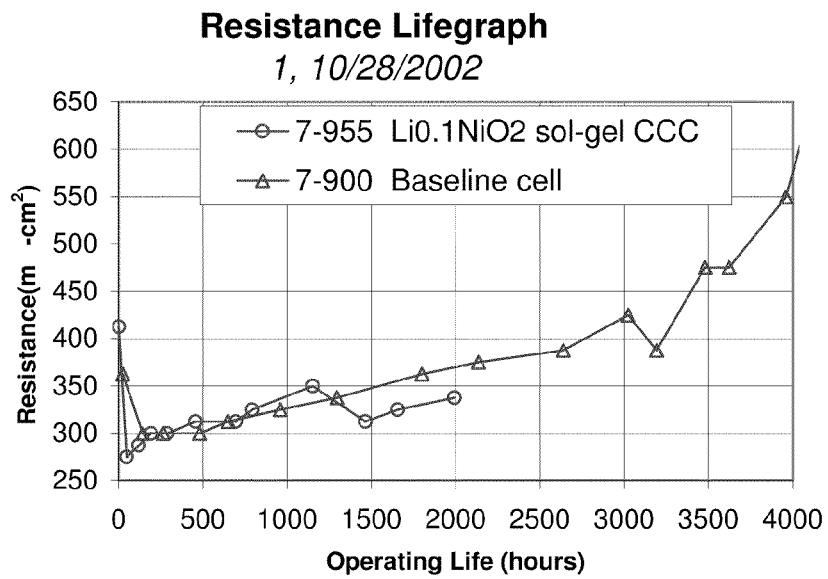
FIGS. 7 and 8 show the resistance lifegraphs of molten carbonate fuel cells having cathode side hardware with the lithiated NiO and LSC conductive ceramic coatings of the invention and fuel cells with uncoated cathode side hardware.
Figure 8:
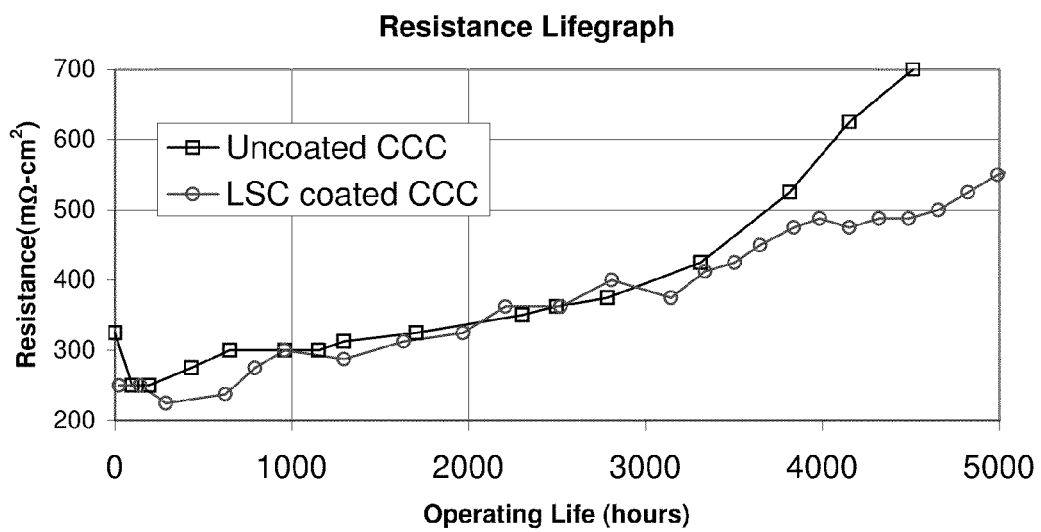

FIGS. 7 and 8 show the resistance lifegraphs of a fuel cells utilizing CCCs coated with the lithiated NiO and LSC coatings of the invention, respectively, as compared to fuel cells utilizing uncoated stainless steel CCCs. As can be appreciated from these graphs, an improved resistance life is realized for the fuel cells using the CCCs with the coatings of the invention.

Figure 9:
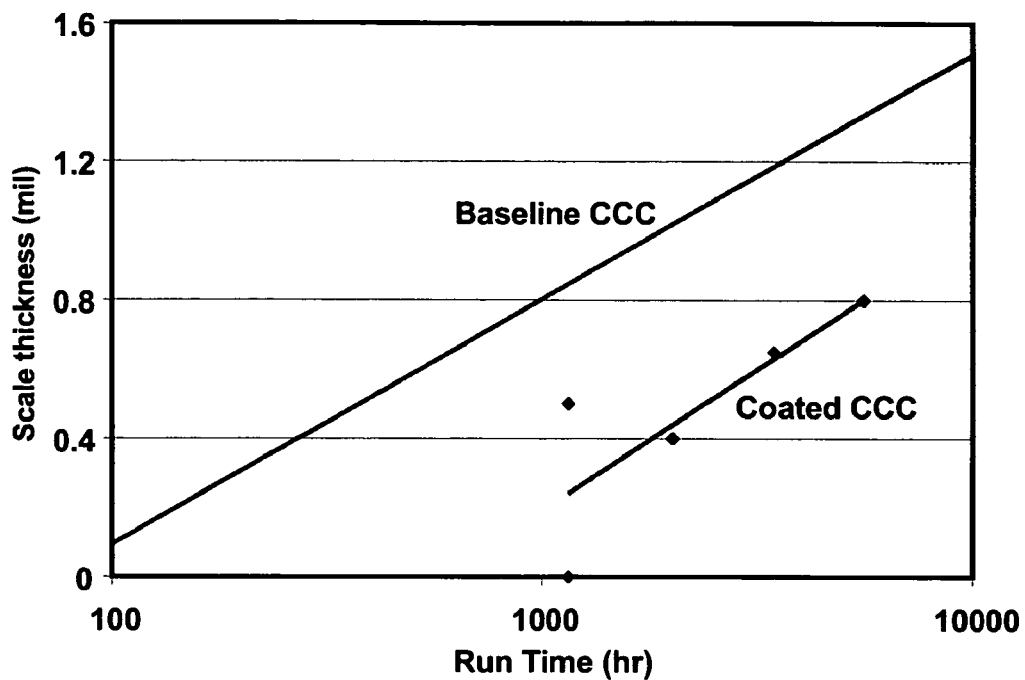
FIG. 9 shows the corrosion thickness after fuel cell testing of cathode side hardware using the conductive ceramic coating of the invention as compared to the corrosion thickness after fuel cell use of uncoated cathode side hardware.

FIG. 9 shows the corrosion thickness after fuel cell testing of CCCs coated with coatings of the invention as compared to the corrosion thickness after fuel cell testing of uncoated CCCs. The coated CCCs of the invention are seen to exhibit measurably less corrosion than the uncoated CCCs.

Figure 10:
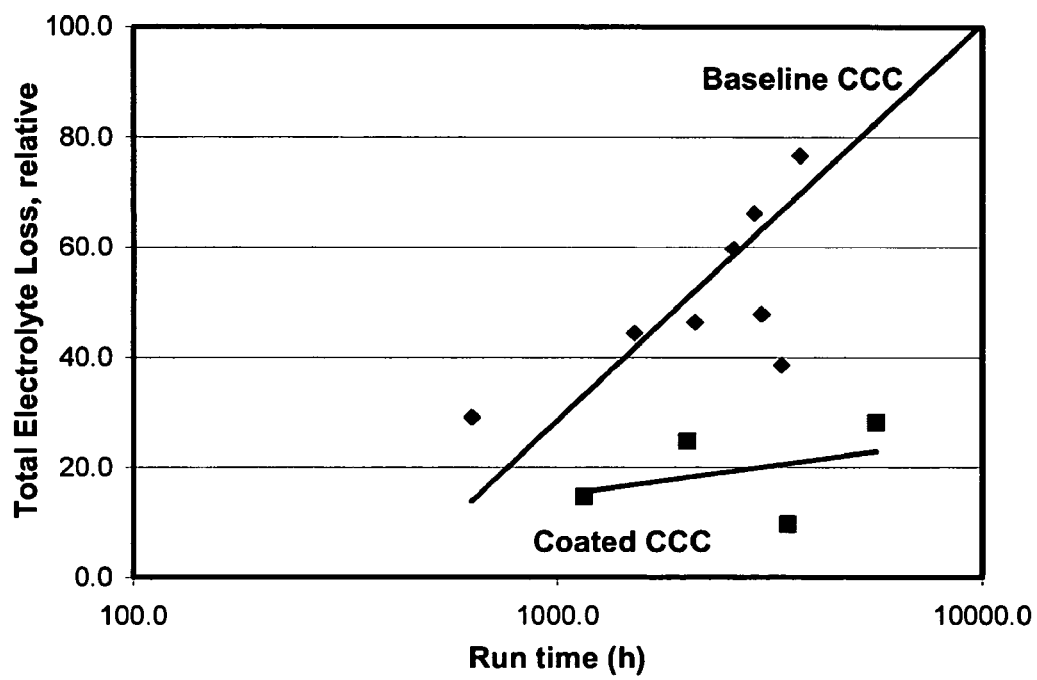
FIG. 10 illustrates the electrolyte loss in a molten carbonate fuel cell using cathode side hardware having the conductive ceramic coating of the invention as compared to the electrolyte loss in a molten carbonate fuel cell using uncoated cathode side hardware.

Finally, FIG. 10 illustrates the electrolyte loss in a molten carbonate fuel cell using CCCs coated with the coatings of the invention as compared to the electrolyte loss in a molten carbonate fuel cell with uncoated CCCs. As can be seen, the electrolyte loss is considerably less in the fuel cell using the coatings of the invention.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A carbonate fuel cell cathode current collector comprising a metallic stainless steel substrate coated with a thin film coating of a conductive ceramic comprising at least one of LSC ($La_{0.8}Sr_{0.2}CoO_3$) and lithiated NiO ($Li_xNiO$, where x is 0.1 to 1), wherein said thin film coating covers more than 95% of the substrate's surface and said thin film coating protects said substrate against corrosion by molten carbonate electrolyte.

2. A carbonate fuel cell current collector in accordance with claim 1 wherein said coating is obtained by a sol-gel process.

3. A carbonate fuel cell current collector in accordance with claim 2 wherein the thickness of said coating is between 0.5 μm and 5 μm.

4. A carbonate fuel cell comprising:
 a cathode;
 an anode;
 a matrix for storing carbonate electrolyte disposed between said anode and cathode;
 a cathode current collector situated adjacent said cathode;
 a bipolar plate situated adjacent said cathode current collector; and
 wherein at least one of said cathode current collector and said bipolar plate includes a metallic stainless steel substrate coated with an electrically conductive ceramic coating comprising at least one of LSC ($La_{0.8}Sr_{0.2}CoO_3$) and lithiated NiO ($Li_xNiO$, where x is 0.1 to 1), wherein said electrically conductive ceramic coating covers more than 95% of the substrate's surface and said thin film coating protects said substrate against corrosion by molten carbonate electrolyte.

5. A carbonate fuel cell in accordance with claim 4 wherein said coating is obtained by a sol-gel process.

6. A carbonate fuel cell in accordance with claim 5 wherein the thickness of said coating is between 0.5 μm and 5 μm.

* * * * *